United States Patent [19]

Miller, Jr.

[11] 4,318,933

[45] Mar. 9, 1982

[54] METHOD FOR DEBITTERING SOYBEANS

[75] Inventor: Harry W. Miller, Jr., Fredericktown, Ohio

[73] Assignee: Harry W. Miller, Jr. Corp., Fredericktown, Ohio

[21] Appl. No.: 196,449

[22] Filed: Oct. 14, 1980

Related U.S. Application Data

[62] Division of Ser. No. 934,839, Aug. 18, 1978, Pat. No. 4,248,141.

[51] Int. Cl.³ .............................................. A23L 1/20
[52] U.S. Cl. .................................. 426/431; 426/460;
426/486; 426/507; 426/634
[58] Field of Search .............. 426/508, 509, 507, 510,
426/486, 634, 431, 460; 99/404

[56] References Cited

U.S. PATENT DOCUMENTS

| | | | |
|---|---|---|---|
| 727,271 | 5/1903 | Blackmon | 99/404 |
| 3,733,202 | 5/1973 | Marmor | 99/404 |
| 4,113,716 | 9/1978 | Gomi et al. | 426/507 |
| 4,152,465 | 5/1979 | Kijima et al. | 426/486 |

*Primary Examiner*—Raymond N. Jones
*Assistant Examiner*—George C. Yeung

*Attorney, Agent, or Firm*—W. Britton Moore

[57] ABSTRACT

A method for debittering soybeans to destroy and extract the bitter taste therefrom. Soybeans are loaded into open baskets with foraminous bottoms suspended from links on a chain conveyor successively and intermittently indexed by rachet driven sprockets through three zones of a processing tank having an exhaust hood. Water preheated to approximately 198° F. flows through the tank and each zone thereof has a steam manifold therein whereby steam is injected into the first zone to raise the water temperature to approximately 214° F. and bubble and agitate the water and the beans loaded in the baskets. The baskets and beans then travel through the second zone wherein they continue to be agitated by action of steam but wherein the temperature is lowered by the injection of tempering water to approximately 212° F. Thereafter, upon entry into zone three, agitation of the beans continue with temperature also being approximately 212° F. The emerging basket with the treated beans therein is subjected to a cold water spray and continued travel of the conveyor inverts the baskets and drops the treated beans therefrom onto a conveyor disposed therebelow for disposal and collection in a container.

5 Claims, 5 Drawing Figures

METHOD FOR DEBITTERING SOYBEANS

This is a division of application Ser. No. 934,839, filed Aug. 18, 1978, now U.S. Pat. No. 4,248,141.

This invention relates to a method for debittering soybeans.

BACKGROUND OF THE INVENTION

The present invention stems from a discovery that certain enzymes lying next to the soybean surface, directly beneath the skin, causes a bitter flavor, and it was determined that it was necessary to debitter the bean so that the protein would not be denatured or in any way decomposed. By experimentation, it was determined that subjecting the beans to too high a temperature destroyed certain proteins therein so that neither the extracted liquid protein, or that remaining in the residue from the extract, would gel properly for use as a soybean curd or in meat analogs.

In addition, with too high a temperature, the full amount of suspendable protein would not extract from the ground bean slurry, and proper proportions of desired amino acids would not be left in the suspendable liquid protein.

It was discovered that the bitterness from these enzymes could be reduced in the suspendable extracted liquid protein by passing live steam through the liquid until the foam from this liquid was boiled down in open vessels, but the bitterness was never entirely absent from the end product. Also, the antitripson factor was not totally eliminated by this open vessel process.

Therefore, in an effort to completely eliminate the antitripson factors, it was proposed to pass live steam into a closed pressure vessel held at 10 P.S.I. for 10 minutes with a small vent cock open so as to assure that the heat was uniform in the entire vessel, after which the liquid protein was blown into a vented chamber. Bitterness was reduced to a greater degree than in the open chamber process. Furthermore, it was determined that continuing this pressure vessel heating for 10 minutes and then exhausting the liquid into a vacuum chamber, reduced the bitterness further. However, this method only helped to decrease the bitterness extracted in the liquid protein, and still left all of the bitterness in the fibrous residue containing considerable protein and fats with a high nutritional value.

In continued efforts to eliminate this bitterness, it was discovered that washing the dry bean in three or four waters somewhat reduced the bitterness. However, the required friction and rubbing of the bean, as well as the soaking, created heat which energized the enzymes so that the bitter flavor premeated the entire bean.

In a further effort, the dry bean was subjected to boiling or parboiling, but the heat rate was so slow that the enzymes were activated and released so that the bitterness permeated the entire bean. However, some reduction in bitterness resulted, but, at the same time, the ability to extract protein was reduced.

Continued efforts included soaking the beans until fully hydrated and then rapidly heating with live steam in an open vessel. The process of hydration created slow heat and activated the enzymes and resulted in bitterness permeating the entire bean. Although the live steam drove off some of the volatile oil and gases, no debittering of the bean resulted.

In addition to the foregoing, another method involved hydrating the beans until fully soaked, after which they were ground in a disintegrator with boiling water and steam being injected into the disintegrator. This tended to reduce the bitterness to a considerable degree, but had a tendency to gel part of the protein back into the fiber of the residue so that valuable amino acids were not left in the extractable protein and the residue would not gel, as desired, in meat analogs.

While various other methods have been proposed for treating soybeans and other nuts and fruits, such as those of U.S. Pat. Nos. to Darling 2,606,916, Steinkraus 3,721,569, Homann 4,024,168, and Grassl 4,035,194, none have been successful and satisfactory in destroying and expelling the enzymes lying next to the covering under the skin of the bean and retaining the beans in the dry state so that they can be shipped, stored, and used without the loss of protein, or being decomposed or injured for use in any beverage, meat analog, or by-product.

OBJECTS OF THE INVENTION

The principal object of the present invention is to provide a method for debittering soybeans and the like by permeating the skin to separate it from the bean fast enough so that the shock heat will destroy the enzymes on the surface of the bean and, at the same time, drive off the volatile gases and oils, created by the destruction of the enzymes, before they can permeate the bean itself.

Another object is the provision of a debittering apparatus including a chain link conveyor having a series of open baskets with foraminous bottoms suspended therefrom and into which soybeans are loaded for successive and intermittent indexing through three zones of an exhaust hooded processing tank and through which preheated water flows, with each zone having steam manifold means therein for injecting steam into the water therein and bubbling and agitating the water and beans loaded in the basket immersed therein to expand the skins and explode the jackets to release the volatile gases therefrom.

Still another object is to provide a method for debittering soybeans and the like which includes conveying beans in open baskets carried by the links of a conveyor through an exhaust hooded processing tank with preheated water flowing therethrough so that the baskets and beans are successively and intermittently moved while immersed for a short period of approximately three minutes through each of three zones therein and into which steam at increased temperature is injected to bubble and agitate the water and beans to expand the skins and explode the jackets and release and expel the enzymes lying next to the coverings under the skins of the beans.

A further object is the provision of an exhaust hooded processing tank through which preheated water flows and a conveyor having a series of foraminous bottomed baskets with soybeans therein successively and intermittently travels to move the baskets for a short period of approximately one minute through each of three zones having steam manifolds therein for injecting steam thereinto and bubbling and agitating the water and the beans immersed therein to expand the skins and explode the jackets therefrom for release and expelling of the enzymes and volatile gases upwardly through the water and exhaust hood.

Still a further object is to provide a method for debittering soybeans and the like wherein each basket containing treated soybeans emerging from the processing tank is subjected to cold water sprays for chilling and insuring that the beans are not hydrated but are surface wet, after which the baskets are inverted to discharge the beans onto a conveyor for disposition and collection in a container associated therewith for removal thereof and subsequent treatment in tumbler dryers, wherein the outer coat of water and the skins are removed from the beans to leave dry bean halves adaptable for various uses, such as, oil and protein extraction, soy flour, meat analogs, and the like.

Another object is the provision of a closed circuit method for debittering soybeans wherein a basket conveyor with beans loaded into baskets thereon is indexed through zones of an exhaust hooded processing tank with preheated water flowing therethrough and with steam being introduced into each of the zones to agitate the water and beans immersed therein to destroy the enzymes on the surfaces of the beans and drive off the volatile gases and oils for release through the exhaust hood, and wherein the treatment water discharged from the processing tank is filtered to remove bean particles separated during processing and is introduced into a balance tank where fresh water is added thereto and the water preheated for reintroduction into the inlet end of the tank.

SUMMARY OF THE INVENTION

The foregoing objects are attained, according to the present invention, by utilizing a method whereby dry soybeans are manually loaded into open topped baskets suspended from the links of spaced horizontally disposed and longitudinally extending conveyor chains of a conveyor and are successively and intermittently indexed and longitudinally moved through three zones in an exhaust hooded processing tank. Water preheated to approximately 198° F. is introduced at the inlet end of the tank and exits from the outlet end, and each of the zones of the tank has a steam manifold extending across the bottom thereof into which steam at approximately 214° F. is injected.

As the steam passes upwardly through the water in each of the zones, it will create a turbulence by bubbling therethrough to separate and cause the beans confined in the baskets and immersed in the preheated water to be agitated and heated so that the skins will expand and their jackets exploded resulting in the enzymes being destroyed and the volatile gases released upwardly through the water for escape through the exhaust hood.

The beans are then carried by a basket into the next adjacent zone where they are also subjected to rolling, bubbling, agitation by the steam passing upwardly through the water. In this second zone, thermo-controlled inlet valves control and somewhat reduce the temperature of the water and steam injected thereinto by the water injector and steam manifold therein to approximately 212° F., after which the basket and beans therein enter into the next adjacent or third tank zone wherein the temperature of the water and steam being injected thereinto by the water injector and steam manifold is also approximately 212° F.

Each of the aforesaid three steps requires approximately one minute, or a total processing time of three minutes, after which each basket with treated beans therein will emerge from the outlet end of the tank and the rolling steam-injected water of each zone thereof. A cold water spray extending transversely of that end of the tank and arranged above the exiting basket will spray streams over the treated beans therein. The beans are not hydrated, but are merely surface wet from the short processing in the tank, and, continued travel of the conveyor will invert the loaded basket and drop the treated beans downwardly onto a lower horizontal and forwardly projecting belt conveyor which will carry the beans forwardly away from the processing tank for dropping off the outer end of the conveyor and into the open upper end of a container extending thereacross and therebelow. The container with treated beans therein is then transported to and the beans placed in batch tumbler dryers for drying and removal of the outer coat of water and the skins thereon, so that dry bean halves will remain in the dryers for removal therefrom and storage for subsequent use for oil and protein extraction, soy flour, meat analogs, et al.

Water exiting from the discharge end of the tank will be passed through a skimming screen or filter for removal of any bean particles, dislodged during processing, from the water which then flows into a balance tank where about ten percent of the water lost during processing and discharged through a drain as waste and the remainder will again be filtered and the waste portion replaced with about ten percent fresh water. A preheater in the balance tank will reheat the water to the initially approximately 198° F. for reintroduction through the inlet pipe into the processing tank to complete the cycle.

SPECIFIC DESCRIPTION

Figure 1:
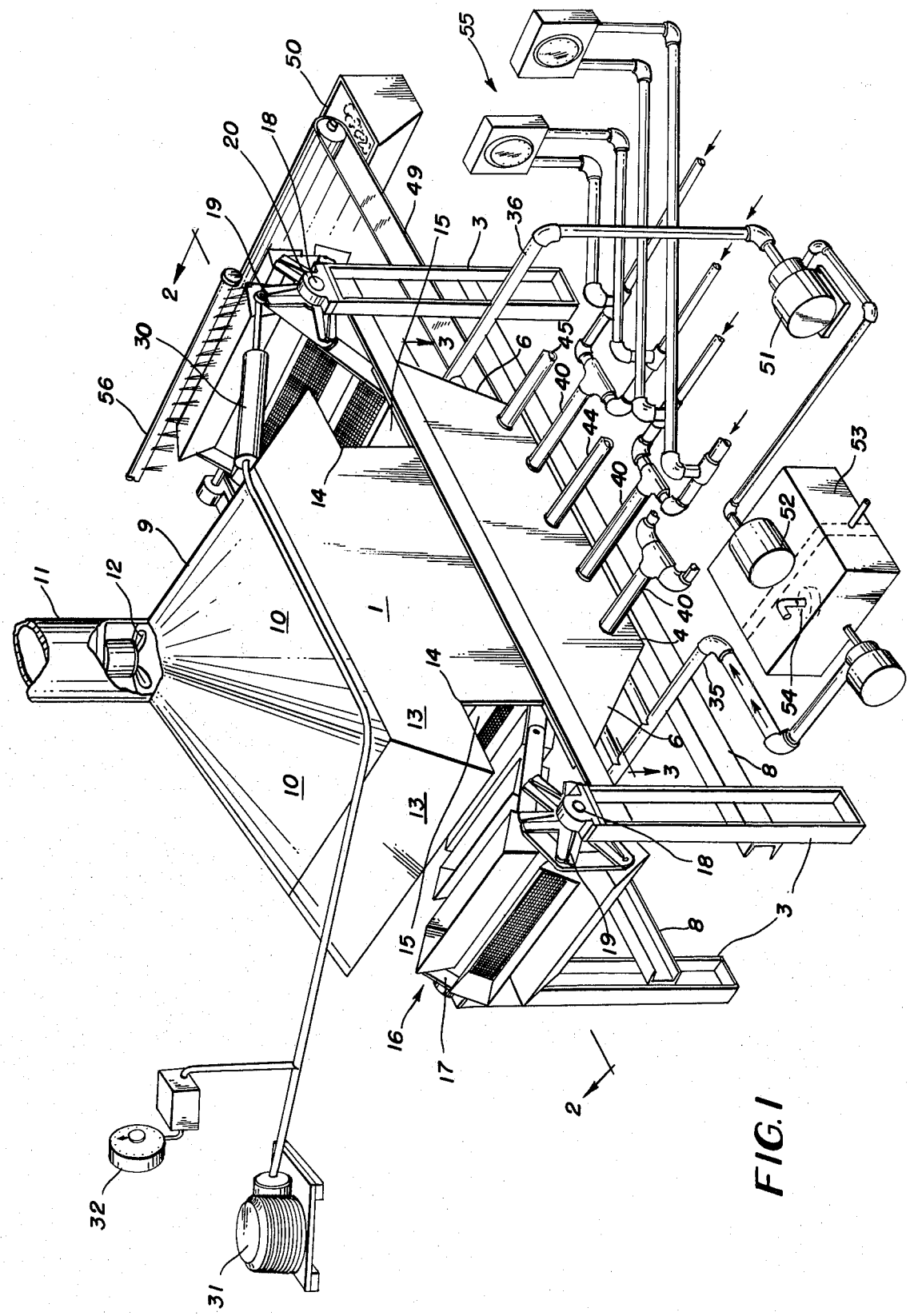
FIG. 1 is a perspective view of the exhaust hooded processing tank, basket conveyor for carrying beans to be treated therethrough, water and steam injection pipes, conveyor upon which treated beans are discharged, collecting container for receiving the debittered beans, and the associated system for introducing water and steam and filtering after debittering, and refreshing, preheating and reintroducing water into the tank, the various components being shown schematically.

Referring more particularly to the drawings, wherein similar reference characters designate like parts throughout the several views, and as best shown in FIG. 1, a generally rectangular tank 1 is supported on legs 3 of an upstanding frame 2. Tank 1 has a flat bottom 4, upright side walls 5, upwardly and outwardly sloping end walls 6, and is open at its top, as at 7. The bottom is mounted on and is suitably supported by spaced frame struts 8, spaced below and parallel to the top of the frame, and the flat side walls 10 of a generally truncated exhaust hood 9 is attached to and projects upwardly from the upper end of the frame. A stack 11 with a motor-controlled fan 12 therein serves as an exhaust for processing tank 1.

The front and rear walls 13 of hood 9 are removed at their lower ends, as at 14, to provide through openings 15 for the passage through the tank and hood of a suitable basket conveyor 16. The latter includes a pair of suitable interconnected link chains 17 which travel over a pair of sprockets 19 carried by shafts 18 suitably journalled, as at 20, at the front and rear ends of frame 2 at the upper end thereof.

Figure 5:
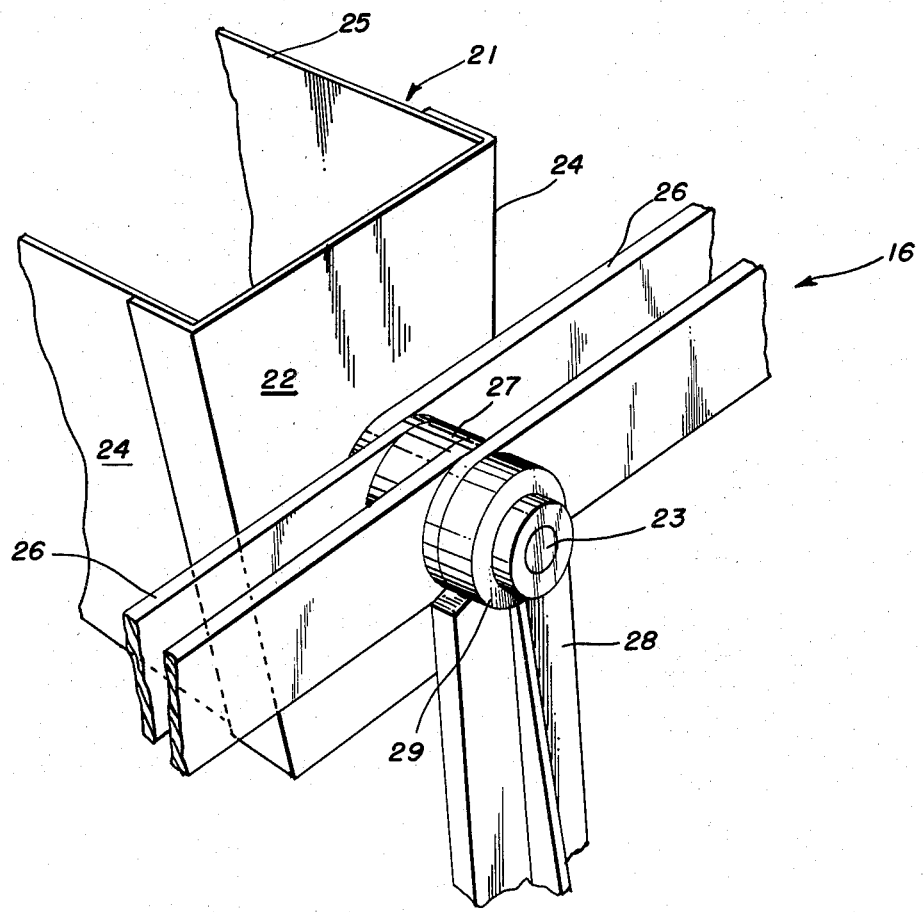
FIG. 5 is a perspective view of a portion of one end of a conveyor basket and its connection to the links of one of a pair of conveyor chains.

A plurality of baskets 21, each having flat end walls 22 with stub shafts 23 projecting endwise therefrom, and upwardly and outwardly sloping side walls 24 and an open upper end 25, are suitably affixed at their stud shaft ends to the chain links 26 of conveyor 16, as best shown in FIG. 5, so as to be carried by and suspended therefrom with the open ends uppermost as the conveyor is caused to travel through tank 1. As will be apparent from FIGS. 1 and 5, the stub shafts 23 and the pivots 27 between links 26 interfit recesses 29 in the outer ends of each of the arms 28 of sprockets 19 so that, as the sprockets are rotated and indexed by a suitable and conventional compressed air controlled piston indexing means 30 interconnected to one of the sprockets, the indexer ratchets the drive sprocket in a clockwise direction and intermittently and successively moves the conveyor and baskets through the tank, as and for a purpose presently to be described. In this connection, the indexing means 30 may be controlled by a suitable and conventional electric timer 32, associated with the usual and conventional compressor 31, for intermittently controlling the air piston for ratcheting the sprocket. Each basket 21 has a foraminous bottom 33, which may be in the form of a suitable hardware cloth welded or otherwise connected to the basket walls. The bottom 33 is flat and disposed thereabove in each basket is a generally flat metal screen 34 which snugly interfits the lower end of the basket. The upper course of the conveyor chains will travel through the tank, whereas the lower course will pass therebelow.

Figure 3:
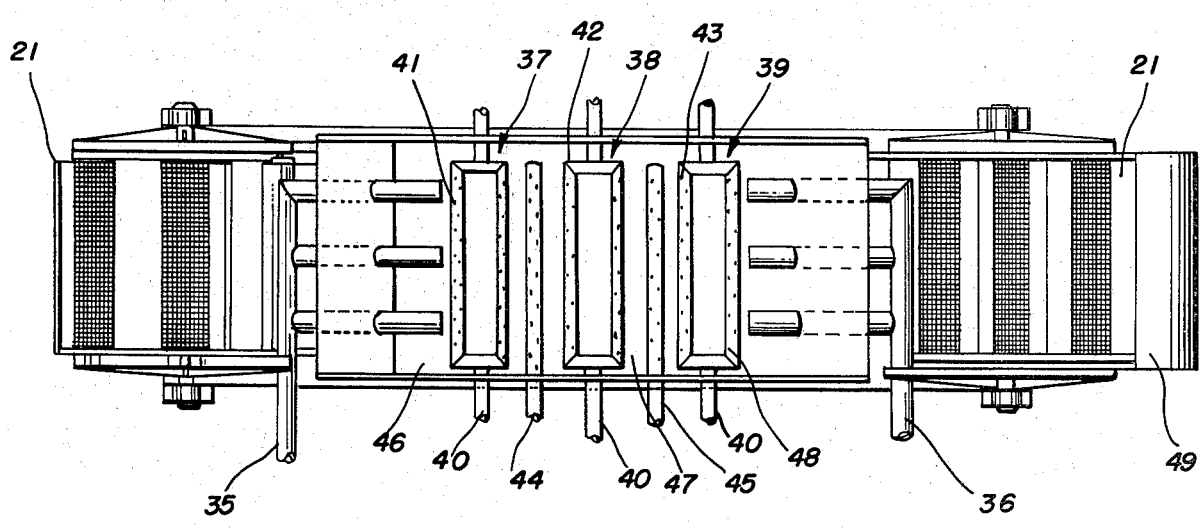
FIG. 3 is a plan view of the processing tank, with the exhaust hood removed.
Figure 4:
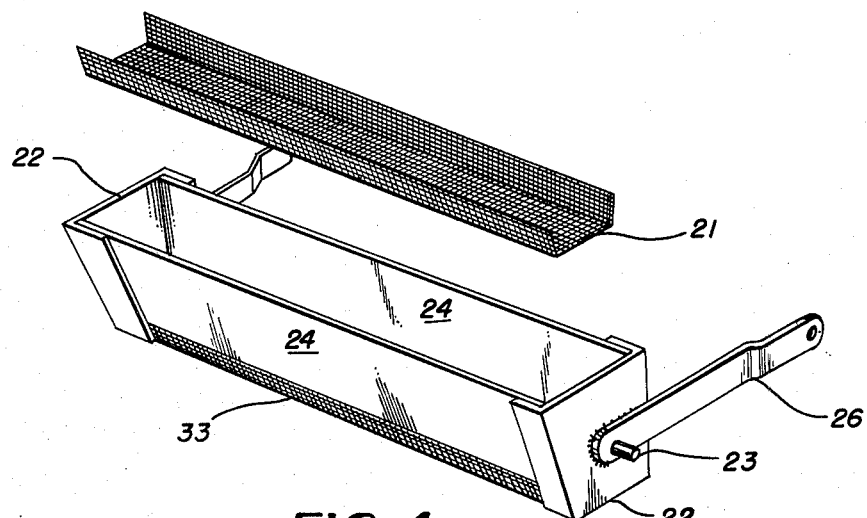
FIG. 4 is a perspective view of one of the bean receiving conveyor baskets, showing the hardware cloth bottom and screen insert arranged therein.

Water, preheated as presently to be described, is introduced through conduits 35 into the forward or inlet end of tank 1 and is caused to flow therethrough for discharge through conduits 36 at the opposing or outlet end thereof. As best shown in FIG. 3, arranged in the lower portion of tank 1, below the path of travel of conveyor baskets 21, are three spaced, horizontally disposed, transversely extending steam manifolds 37, 38 and 39, each of which includes end inlet pipes 40 and spaced apart, parallel, branch, spray nozzled or apertured pipes 41, 42 and 43 through which steam is injected from a suitable heating source, not shown. Interposed in the spaces between the manifolds and parallel thereto are apertured water injector conduits 44 and 45 through which streams of water are injected upwardly into the tank. Thus, steam is injected into the manifolds and upwardly through the branch pipes 41–43 thereof, and water is injected into the tank with both the steam and water bubbling upwardly through the preheated water in the tank, as presently described, to agitate and render the water turbulent. The steam manifolds 37–39 create three treatment zones or areas 46, 47 and 48 in the tank.

Arranged and suitably supported at the rear or discharge end of the frame and tank is a horizontally and rearwardly projecting suitable and conventional motor driven belt conveyor 49, which is spaced below the rearwardmost conveyor sprockets 19. Suitably removably suspended from the outer end of the belt conveyor 49 is an open topped container 50 for receiving treated soybeans dropped on the conveyor 49, as a basket on link conveyor 16 emerges from the processing tank and is inverted to discharge its contents downwardly. When container 50 is filled, it may be removed and replaced by another, and the beans in the container may be suitably transported to and placed in a conventional batch tumbler dryer, not shown, for final treatment.

As illustrated in FIG. 1, water discharged from tank 1 through outlet conduits 36 flows through a suitable and conventional pump 51 and thence into a suitable and conventional skimming screen filter 52 for removal of any trash or bean particles and thence into a suitable float controlled balance tank 53. As about 10% of the water will be lost during the processing, as well as being drained with waste therein, that amount of fresh water is added to that in the balance tank 53 and a suitable and conventional preheater 54 therein will reheat the water to the approximate 198° F. required for introduction through inlet conduits 35 into the processing tank.

A batch of about five to ten pounds of soybeans to be treated is manually loaded into each of the baskets 21 and the chain conveyor sprockets will be moved, under the timed operation of the air controlled piston indexing means 30, approximately 1/6 of the distance of the sprocket's circumference per minute, so that one filled basket will enter the first treatment zone 46 and be immersed in the water preheated to approximately 198° F. therein, while one basket filled with treated beans will exit from the tank each minute. The water level in the tank will be maintained by the discharge end 36 so that ⅔ of each basket will be submerged in liquid.

Steam entering through manifold 37 will bubble upwardly through the water in first zone 46 creating a turbulence and separating and causing the beans in basket 21 disposed therein to be agitated. In addition, the injected steam will increase the temperature of water in zone 46 above the manifold at between approximately 212° to 214° F. As the baskets are motivated by the intermittent rotation of the chain sprockets, a basket will enter zone 46 and will remain in the rolling, boiling high temperature water therein for approximately 30 to 90 seconds, depending on the size of the soybeans. The quick entrance of the basket filled with beans into this first zone and the turbulence of this high temperature rolling water separates the beans from touching each other so that the entire surface of each bean obtains the same damp heat shock treatment penetrating the skin thereof and expands the bean so that the skin is ruptured. This enables the intense heat to destroy the enzymes on the outside surface thereof and starts the volatile oil and gases to escape with the exhausting steam through vent hood 9.

As certain varieties of soy beans are much larger than others; also, the skins of some varieties are tougher and thicker, I use superheated water which will be released through manifold 40 at a temperature of 245° F. in zone 46 so as to penetrate the skin of these difficult varieties fast enough so that the skin can be ruptured and allow the volatile bitter flavor to escape through the ruptured skin instead of penetrating into the fiber of the bean. It will be noted that superheated water when released into atmospheric pressures creates a much greater turbulence and the shock heat, although instantaneous, is much greater than steam being released, although the temperature will soon be reduced to 214° F. Therefore, whenever zone 46 is referred to in this process superheated water will be used in preference to steam on this type of soy bean.

After the termination of this 30 to 90 second time period, continued actuation of the sprockets and chains will remove the basket from first zone 46 into the next zone 47, where steam from manifold 38 keeps the water in the zone in a turbulent, steaming roll, with the water temperature being maintained at approximately 212° F. by water injected thereinto through conduit 44. Water in this second zone is maintained at the desired temperature by a suitable and conventional recorder controller 55, schematically shown in FIG. 1, equipped with the usual thermal probe and air-operated valve, not shown, which allows water to enter through injector conduits 44 and 45 as needed. Thereafter, baskets 21 from the first and second zones 46 and 47 move forwardly so that a basket enters the third and last zone 48, where steam manifold 39 will maintain the same exhausting-steam action, as occurred in zones 46–47. However, water entering zone 48 through conduit 45 will be regulated by recording controller and air valve 50 so that a temperature of approximately 212° F. will be maintained therein for about 30 to 90 seconds and enable the exhausting steam to carry off any remaining volatile gases or oils through exhaust vent 11.

Figure 2:
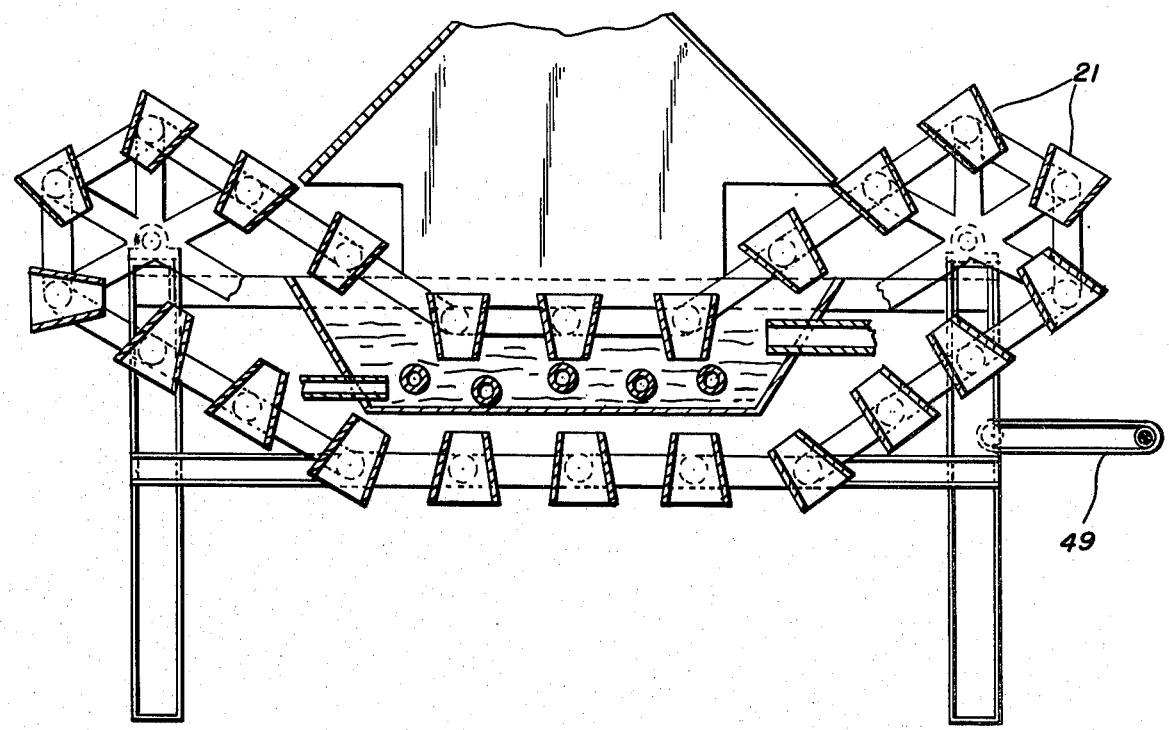
FIG. 2 is a section on the line 2—2 of FIG. 1.

As the sprockets make another 1/6 revolution, the basket emerging from the last zone 48 will be elevated above the tank enabling excess water to drain off. After the proper interval, depending on bean size, the baskets will move another 1/6 sprocket turn, and will be disposed under a transversely extending apertured or nozzled spray conduit 56 which sprays cold water downwardly over the beans in the basket. This cold water spray will stop any penetration of moisture into the fiber of the bean. Continued rotation of the sprockets, will upset or invert the filled baskets, as best shown in FIG. 2, and dump the fully processed beans therein onto belt conveyor 49 for delivery to and dropping into the container 50 disposed therebeneath the end thereof. When filled with beans, the container 50 is removed and the contents dumped into the previously mentioned, but not shown, batch tumbler dryers wherein the surface water on the beans is dried and the hulls removed therefrom.

From the foregoing, it will be apparent that three baskets 21 on conveyor 16 are immersed in the processing tank 1 so as to be acted on by steam from manifolds 37–39 and water from conduits 44 and 45. Should larger production be desired than obtainable in a three basket processor, the tank 1 may be lengthened and more baskets placed on conveyor 16, which will require more steam manifolds or rings and water conduits or injectors, so that three to five baskets at a time may be receiving the different temperature treatments, described above.

While a preferred embodiment of processing tank and associated treating mechanism has been shown and described, it will be understood that various changes and improvements may be made therein without departing from the scope and spirit of the appended claims.

What I claim is:

1. A method for debittering soybeans and the like to destroy and extract the bitter taste therefrom in an open top processing tank having at least three treatment zones and provided with an exhaust hood thereabove and having spaced steam manifolds in each of the zones adjacent the bottom thereof with water injectors interposed between the steam manifolds, and into and lengthwise through which tank water flows, with a chain conveyor having a series of foraminous bottomed baskets arranged on and depending therefrom for passage through the processing tank, said method comprising the steps of:
   a. preheating the water flowing lengthwise through said tank to approximately 198° F.;
   b. Loading soybeans to be treated into said baskets and successively and intermittently moving said conveyor and said baskets through said tank and immersing the baskets and beans in the preheated water for approximately one minute in each of said zones;
   c. introducing steam through the manifold in the first of said zones to increase the water temperature to approximately 214° F. and bubbling the steam upwardly therethrough to render the boiling water turbulent to roll and separate the beans and penetrate the skins thereof to expand and rupture the beans so that the enzymes on the outside surfaces thereof are destroyed by the intense heat enabling the volatile oil and gases to escape with the exhausting steam through the exhaust hood;
   d. introducing water through the water injector and steam through the manifold in the second of said zones at a reduced temperature of approximately 212° F. as a filled basket enters that zone to continue to render the water therein turbulent;
   e. and introducing water through the water injector and steam through the manifold in the third of said zones as a filled basket enters that zone at the same temperature of approximately 212° F. as in said second zone whereby the exhausting steam will carry off any remaining volatile gases and oils through the exhaust hood.

2. A method as set forth in claim 1 including the step of subjecting the beans in the baskets emerging from said third zone and tank to cold water sprays to stop penetration of moisture into the fiber thereof.

3. A method as set forth in claim 2 including the additional step of discharging the treated beans from said basket after being cold water sprayed for subsequent drying and storage.

4. A method as set forth in claim 3 including the step of discharging the treated beans from said basket after being sprayed onto a conveyor belt arranged therebeneath for delivery to a collector for subsequent drying and storage.

5. A method as set forth in claim 1 including the steps of passing the water discharged from said tank to filter means for removing bean particles therefrom and replenishing expended water and preheating it to the approximate 198° F. temperature required for reintroduction into the tank.

* * * * *